Aug. 15, 1933.  J. F. ROGERS ET AL  1,922,781
AUXILIARY SPRING FOR MOTOR CARS
Filed May 26, 1931
FIG_1_
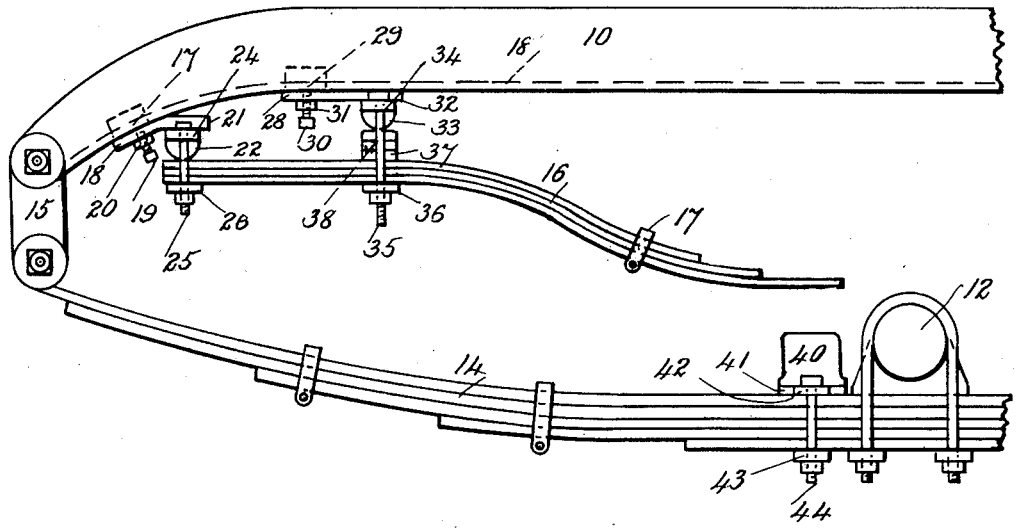
FIG_2_
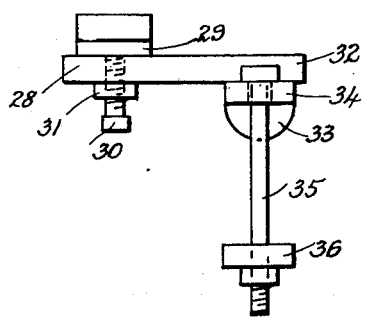
FIG_4_
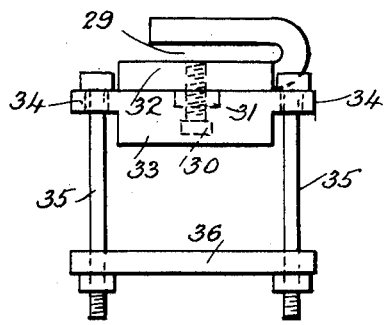
FIG_5_
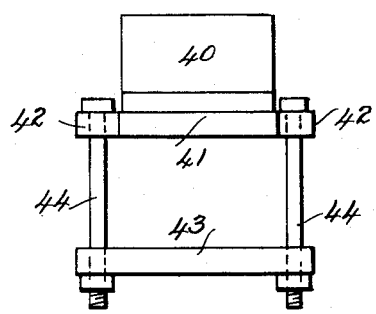
FIG_3_
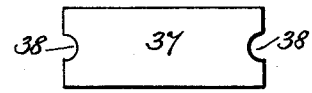
Inventors:
Joseph F. Rogers, and
William D. Doonan
by Herbert W. P. Jenner
Attorney.

Patented Aug. 15, 1933

1,922,781

UNITED STATES PATENT OFFICE 1,922,781

AUXILIARY SPRING FOR MOTOR CARS

Joseph F. Rogers and William D. Doonan,
Butte, Mont.

Application May 26, 1931. Serial No. 540,138

4 Claims. (Cl. 267—45)

This invention relates to auxiliary springs adapted to be secured to the frames of motor cars to supplement the action of the usual leaf springs when the car is loaded and is passing over rough places. This invention consists in the novel construction and combination of the parts hereinafter fully described and claimed, which enable the auxiliary spring to be attached and adjusted to various makes of motor cars with great facility, and without drilling holes in or otherwise altering anything about the motor cars.

In the drawing, Fig. 1 is a side view of the rear end portion of the frame of a motor car and a portion of its usual leaf spring, showing the auxiliary spring secured in position. Fig. 2 is a detail side view of the front clamp. Fig. 3 is a plan view of a spacer plate. Fig. 4 is an end view of the front clamp. Fig. 5 is a detail end view of the buffer.

The rear end portion 10 of the frame of the motor car is of any approved form and construction, and is supported over the rear axle 12 by a semi-elliptic laminated leaf spring 14, which is attached to the rear end of the frame 10 by links 15 in the usual way. An auxiliary leaf spring 16 is provided, and is of any approved shape. This spring 16 also preferably is laminated, and its parts are connected together by a clip 17. The rear end portion of the spring 16 is rigidly secured to the underside of the frame 10 by a rear clamp 18 and a front clamp 28. The rear clamp 18 has a jaw 17 which is slipped over the flange or lower member 18' of the frame, and is secured thereto by a set-screw 19 having a jam nut 20. Any other approved fastening devices can be used to secure the clamp to the frame.

The rear clamp has a plate 21 which projects forwardly of its jaw, and which has a convex bearing bar 22 extending across its underside and bearing against the spring, and permitting it to be adjusted pivotally. Lugs 24 are formed on the clamp at the ends of the bar 22, and 25 are bolts which engage loosely with holes in these lugs and in a yoke 26 under the spring, and which secure the spring to the rear clamp.

The front clamp is similar to the rear clamp, but is shaped differently to adapt it to its different position on the frame. The front clamp has a jaw 29 secured to the frame by a set-screw 30 and jam nut 31. The front clamp also has a projecting plate 32 provided with a convex bearing bar 33, which permits the adjustment of the spring, and it has lugs 34. The front clamp is secured to the spring by the lugs 34, bolts 35 and a yoke 36. All of these parts are similar to the corresponding parts of the rear clamp, but the bolts 35 are longer, and spacer plates 37 are interposed between the convex bearing bar and the spring. These plates have notches 38 in their ends which engage with the bolts 35 and hold the plates in place. As many plates as necessary are used to fill the space between the spring and the bearing bar, and to adjust the position of the free end portion of the auxiliary spring.

A buffer 40 of rubber or other elastic material is secured to the main leaf spring 14 under the free end portion of the auxiliary spring, leaving a suitable space between them. The buffer is secured by any approved means, and it is preferably mounted on a plate 41 having lugs 42 at its ends which are connected to a yoke 43 under the spring by bolts 44, so that the buffer is held securely in position.

The free end of the auxiliary spring is normally spaced some distance from the buffer. The distance of the free end of this spring from the buffer may be regulated by varying the number of spacer plates 37 between the spring and the bearing bar 33 of the forward clamping device. When the car is heavily loaded the free end portion of the auxiliary spring is pressed down towards the buffer, and may rest on it. When the car passes over rough places the auxiliary leaf spring strikes the buffer and relieves the frame of the car from objectionable jolts. The auxiliary spring usually comes into action only when the car is loaded and the road is rough. At other times the usual light springs with which cars are furnished, so that the cars will ride easy, are sufficient for use and comfort. This auxiliary spring and buffer can be clamped and adjusted easily and quickly to any approved make of car, and without drilling holes in the car frame or changing anything about the car. Slight differences in shape in the frames of different makes of cars are met by shifting the positions of the front and rear clamps upon the frame, and also by shifting the clamps longitudinally upon the auxiliary spring before securing them to it.

The free end portion of the auxiliary leaf spring may be arranged to strike the main leaf spring, but a buffer is preferably provided for it to engage with.

What we claim is:

1. An auxiliary spring for a motor car, front and rear clamps for securing the said spring to the frame of the car, the rear clamp being provided with a convex bearing bar for the said spring, and means for securing each clamp to one end portion of the said spring.

2. An auxiliary leaf spring for a motor car as set forth in claim 1, the said front clamp being also provided with a convex bearing bar for the spring and having a spacing device arranged between its bearing bar and the said spring.

3. An auxiliary leaf spring for a motor car as set forth in claim 1, the said front clamp being also provided with a convex bearing bar for the spring and having a series of spacer plates interposed between its bearing bar and the said spring and provided with means which prevent them from slipping out of place.

4. An auxiliary leaf spring for a motor car as set forth in claim 1, the said front and rear clamps being provided with jaws for engaging with a portion of the frame, and set-screws and jam nuts for securing the jaws in place.

JOSEPH F. ROGERS.
WILLIAM D. DOONAN.